(12) United States Patent
Taylor

(10) Patent No.: US 11,080,403 B1
(45) Date of Patent: Aug. 3, 2021

(54) SECURELY CONSTRUCTING A TRUSTED VIRTUAL ENVIRONMENT

(71) Applicant: HEWLETT-PACKARD DEVELOPMENT COMPANY, L.P., Spring, TX (US)

(72) Inventor: Adrian Taylor, Cambridge (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 337 days.

(21) Appl. No.: 16/226,186

(22) Filed: Dec. 19, 2018

(51) Int. Cl.
| | |
|---|---|
| *G06F 7/04* | (2006.01) |
| *G06F 21/57* | (2013.01) |
| *G06F 21/64* | (2013.01) |
| *G06F 21/53* | (2013.01) |
| *G06F 21/56* | (2013.01) |
| *G06F 21/62* | (2013.01) |
| *H04L 9/32* | (2006.01) |
| *G06F 9/455* | (2018.01) |
| *H04N 7/16* | (2011.01) |

(52) U.S. Cl.
CPC .......... *G06F 21/57* (2013.01); *G06F 9/45558* (2013.01); *G06F 21/53* (2013.01); *G06F 21/565* (2013.01); *G06F 21/566* (2013.01); *G06F 21/6218* (2013.01); *G06F 21/64* (2013.01); *H04L 9/3247* (2013.01); *G06F 2009/45562* (2013.01); *G06F 2009/45587* (2013.01)

(58) Field of Classification Search
CPC ...... G06F 21/57; G06F 9/45558; G06F 21/53; G06F 21/565; G06F 21/566; G06F 21/6218; G06F 21/64; G06F 2009/45562; G06F 2009/45587; H04L 9/3247
See application file for complete search history.

(56) References Cited

U.S. PATENT DOCUMENTS

| | | | | |
|---|---|---|---|---|
| 8,646,028 | B2* | 2/2014 | McKenzie | G06F 21/83 726/1 |
| 10,785,036 | B2* | 9/2020 | Keuffer | H04L 9/0643 |
| 2003/0023872 | A1* | 1/2003 | Chen | G06F 21/57 726/25 |
| 2005/0144045 | A1* | 6/2005 | Corsi | G06Q 40/08 705/4 |
| 2009/0089879 | A1* | 4/2009 | Wang | G06F 21/53 726/24 |
| 2010/0011219 | A1* | 1/2010 | Burton | G06F 21/57 713/182 |
| 2010/0131770 | A1* | 5/2010 | Torrubia | G06F 21/64 713/176 |
| 2010/0281273 | A1* | 11/2010 | Lee | F04B 33/00 713/190 |
| 2011/0145821 | A1* | 6/2011 | Philipson | G06F 9/45533 718/1 |

(Continued)

Primary Examiner — Gary S Gracia
(74) Attorney, Agent, or Firm — HPI Patent Department

(57) ABSTRACT

Approaches for securely constructing a trusted operating environment. A trusted operating environment manager executes on a device and instantiates a trusted operating environment on the device by composing at least of portion of the trusted operating environment using data from an untrusted operating environment also executing on the device. The trusted operating environment manager only permits the trusted operating environment to access the data upon the trusted operating environment manager successfully confirming that the data is presently in a state that has been deemed trustworthy.

21 Claims, 3 Drawing Sheets

---

A TRUSTED OPERATING ENVIRONMENT MANAGER INSTANTIATES A TRUSTED OPERATING ENVIRONMENT BY COMPOSING A LEAST OF PORTION OF THE TRUSTED OPERATING ENVIRONMENT USING DATA FROM AN UNTRUSTED OPERATING ENVIRONMENT
210

THE TRUSTED OPERATING ENVIRONMENT MANAGER ONLY PERMITS THE TRUSTED OPERATING ENVIRONMENT ACCESS TO THE DATA UPON THE TRUSTED OPERATING ENVIRONMENT MANAGER SUCCESSFULLY CONFIRMING THAT THE DATA IS PRESENTLY IN A STATE THAT HAS BEEN DEEMED TRUSTWORTHY
220

(56) References Cited

U.S. PATENT DOCUMENTS

| | | | |
|---|---|---|---|
| 2012/0047284 A1* | 2/2012 | Tarkoma | H04L 67/04 709/247 |
| 2012/0054744 A1* | 3/2012 | Singh | G06F 9/45558 718/1 |
| 2012/0173866 A1* | 7/2012 | Ashok | G06F 9/45558 713/150 |
| 2012/0265976 A1* | 10/2012 | Spiers | G06F 9/45533 713/2 |
| 2012/0290850 A1* | 11/2012 | Brandt | G06F 21/6218 713/189 |
| 2015/0040130 A1* | 2/2015 | Ali | G06F 21/575 718/1 |
| 2015/0143362 A1* | 5/2015 | Lukacs | G06F 9/4843 718/1 |
| 2016/0140343 A1* | 5/2016 | Novak | H04L 63/0428 713/2 |
| 2016/0162685 A1* | 6/2016 | Feroz | G06F 9/45558 726/22 |
| 2016/0164880 A1* | 6/2016 | Colesa | G06F 9/45558 726/1 |
| 2016/0379015 A1* | 12/2016 | Samsonov | G06F 21/6209 713/193 |
| 2017/0024570 A1* | 1/2017 | Pappachan | G06F 21/602 |
| 2018/0046479 A1* | 2/2018 | Ghosh | G06F 21/53 |
| 2018/0137465 A1* | 5/2018 | Batra | G06Q 10/103 |
| 2018/0315026 A1* | 11/2018 | Kraemer | G06Q 30/0277 |
| 2018/0349627 A1* | 12/2018 | Kaushik | G06F 21/6227 |
| 2019/0018887 A1* | 1/2019 | Madisetti | H04L 9/3247 |
| 2019/0179711 A1* | 6/2019 | Luo | G06F 11/1464 |
| 2019/0205898 A1* | 7/2019 | Greco | G06Q 20/3829 |
| 2019/0251556 A1* | 8/2019 | McCormick | G06F 16/2379 |
| 2020/0052903 A1* | 2/2020 | Lam | H04L 9/3218 |
| 2020/0311695 A1* | 10/2020 | Cao | G06Q 20/389 |
| 2020/0322128 A1* | 10/2020 | Hu | H04L 9/3218 |
| 2020/0322182 A1* | 10/2020 | Anshuman | H04L 12/4679 |
| 2020/0333295 A1* | 10/2020 | Schiffres | B22F 10/38 |

* cited by examiner

SECURELY CONSTRUCTING A TRUSTED VIRTUAL ENVIRONMENT

FIELD OF THE INVENTION

Embodiments of the invention relate to the creation of a trusted operating environment using a portion of an untrusted operating environment.

BACKGROUND

A great deal of time, money, and effort is spent in the fight against security risks, such as viruses, malware, exploits, intrusions, and other dangers, to enterprise computing. A malware infection may require a compromised system to be erased and re-imaged to remove the malware, which can also result in great expenditures of time and money as well as loss of productivity.

While terms such as viruses, malware, and exploits may have specific definitions in the art, as used herein the term "malware" shall refer to any type of computer code and/or other data introduced from outside a computer system or network of computers that may be used to damage or otherwise cause aspects of the computer system or network of computers to malfunction or perform in an unintended manner. Thus, as used herein, the term "malware" encompasses viruses, exploits, worms, and any type of programmatic security risk.

Malware may be introduced into a computer network through a wide variety of avenues, such as email or a malformed JPEG or other code on a web page that is downloaded to a computer via a web browser. Malware generally follows a common lifecycle; namely, the malware will exploit a weakness in the computer system or network, the malware will drop and execute a payload, the malware will attempt to escalate its privileges, the malware will take steps to persist on the system and/or network despite efforts to remove it, and finally the malware will propagate to other computers. If the malware is unable to be detected using current approaches, then appropriate countermeasures cannot be enacted and systems may become infected.

Virtualization techniques have been used by the prior art for combating malware. To illustrate one approach, a hypervisor may instantiate a virtual machine, which is an emulation of a computer system. The virtual machine may be used to contain malware so that the malware cannot spread outside the confines of the emulated computer system. U.S. Pat. No. 8,972,980 (the '980 patent), entitled "Automated Provisioning of Secure Virtual Executing Environment Using Virtual Machine Templates Based on Requested Activity," granted on Mar. 3, 2015, the disclosure of which is hereby incorporated by reference for all purposes as if fully set forth herein, discusses approaches for instantiating a virtual machine based on one or more templates. The '980 patent also discusses approaches for using an instantiated virtual machine to prevent the spread of malware outside of the virtual machine.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1:
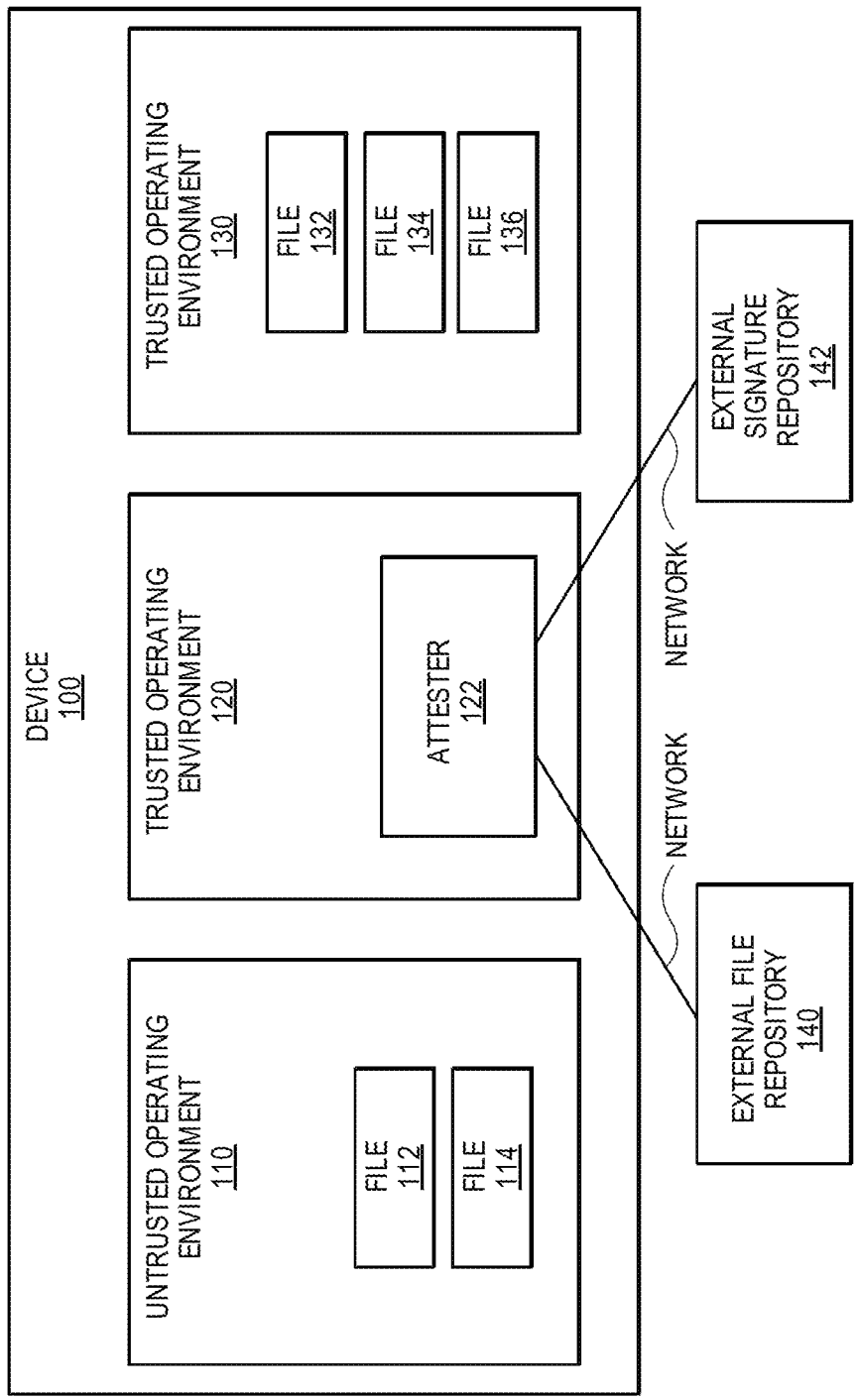
FIG. 1 is a block diagram of a system for securely constructing a trusted operating environment according to an embodiment of the invention.

Approaches for securely constructing a trusted operating environment using an untrusted operating environment are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

There are many ways in which a personal computer (PC) may become exposed, and potentially succumb, to malware. It is highly desirable to execute an application on a PC with the assurance that, while the PC may at some level and to some extent, be infected with malware, at least the application itself has not been tampered with or compromised. In many cases, it need not be necessary to guarantee that the PC is free of malware in its entirety if an application can be executed on that PC such that the application and the environment in which it executes can be attested to be unmodified or uncompromised by malware.

Virtualization techniques have been used in the past to minimize or contain the spread of malware within a computer system. Such virtualization techniques often involve instantiating a virtual machine or isolated environment based on a trusted image of an operating environment. However, the prior art does not include an approach for instantiating a trusted operating environment based on an unsecured or untrusted operating environment. Even if a host operating system initially starts in a known, trusted state, once that host operating system executes and is exposed to the natural hazards inherent during its use, it has been proven difficult to ensure the integrity of a host operating system over time. For this reason, many virtualization techniques of the prior art are unable to use an executing host operating system, or a host operating system that has executed and thus, is no longer in a trusted state, as a basis for creating a trusted operating environment.

Advantageously, embodiments of the invention are directed towards securely constructing a trusted operating environment, which enables a trusted operating environment to be created based, at least in part, upon an untrusted operating environment, such as but not limited to a host operating system. To do so, a trusted operating environment manager may instantiate a trusted operating environment by composing a least of portion of the trusted operating environment using data from an untrusted operating system (such as but not limited to a host operating system) that executes on the same device as both the trusted operating environment. Each time that an access request for a file stored by trusted operating environment is issued to the trusted operating environment, the trusted operating environment manager only permits the access request to be performed upon the trusted operating environment successfully determining that the file is presently in a state that has been deemed trustworthy, e.g., the file has not been modified since leaving the custody of the file's manufacturer. In certain embodiments, the integrity of the trusted operating environment may be attested by an entity existing over a network.

Further details and embodiments of the invention shall be presented in detail below.

Architectural Overview

Figure 3:
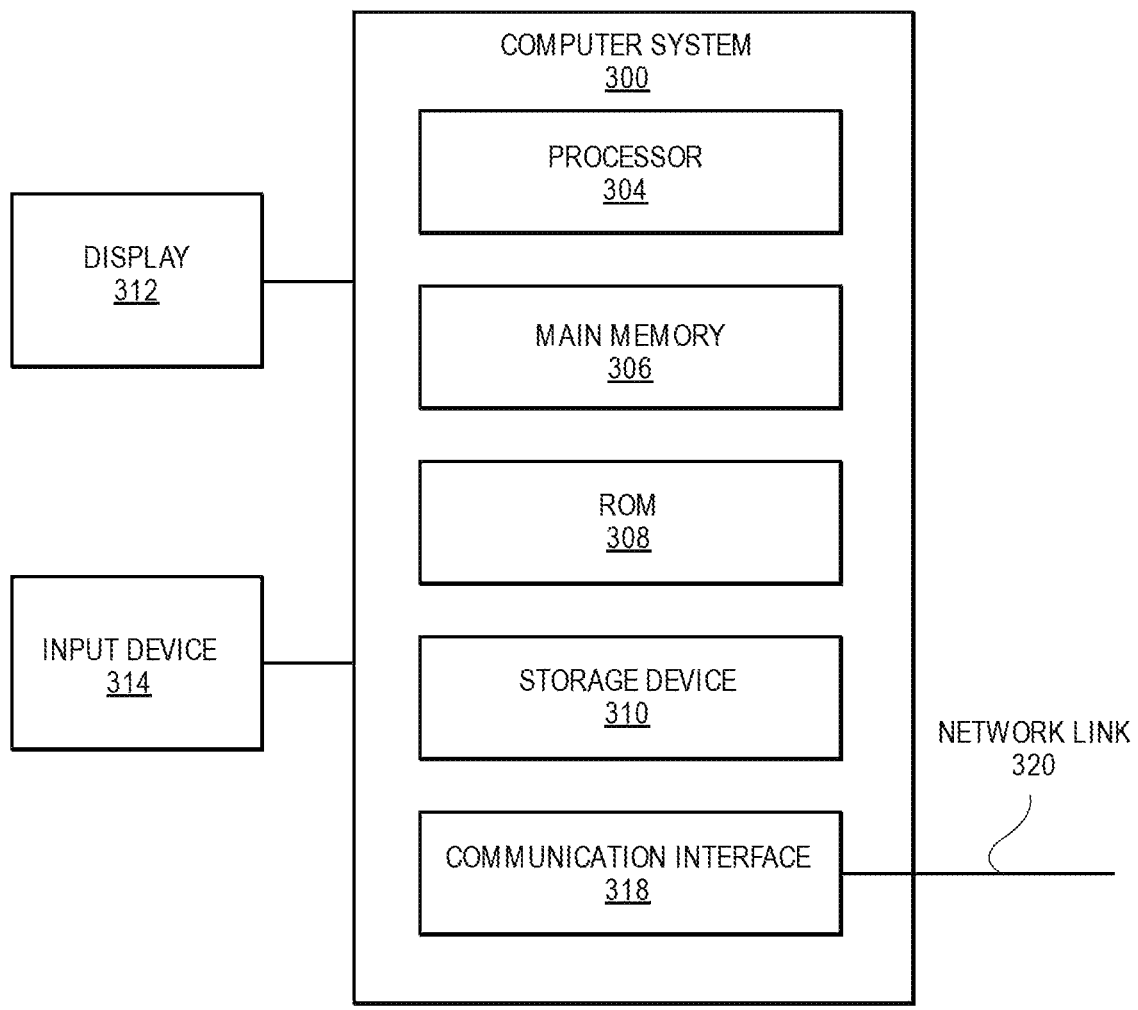
FIG. 3 is a block diagram that illustrates the hardware components of a computer system upon which an embodiment of the invention may be implemented.

FIG. 1 is a block diagram of a system for securely constructing a trusted operating environment according to an embodiment of the invention. The system of FIG. 1 includes device 100, which as broadly used herein, refers to any type of physical apparatus comprising at least one processor that can execute one or more sequences of instructions. Computer system 300 depicted in FIG. 3 is a non-limiting, illustrative example of a physical apparatus that may correspond to device 100. Several non-limiting, illustrative examples of device 100 of FIG. 1 include a PC, a laptop computer, a tablet computer, a server, a router, a cell phone, and a personal digital assistant (PDA).

As depicted in FIG. 1, device 100 comprises three separate operating environments, namely operating environments 110, 120, and 130. As broadly used herein, an operating environment refers to a self-contained bounded environment for executing software. A hardware device may support a single operating environment (such as when only a single operating system is installed on a computer system) or may support multiple operating environments (such as when two or more operating systems execute on the computer system). Non-limiting, illustrative examples of an operating environment include a virtual machine (including an operating system executing thereon), a processing container, a sandbox environment, a trusted computing base (TCB), a hypervisor, and any virtual machine instantiated by a hypervisor.

In embodiments of the invention, an operating environment may be trusted or untrusted. A trusted operating environment is an operating environment whereby the data or files comprised within the operating environment are trusted to be uncompromised. On the other hand, an untrusted operating environment is an operating environment in which there is no basis to believe the integrity of the data or files comprised within have not been compromised. Trusted operating environments possess a characteristic or mechanism to attest the validity of its integrity and/or ensure malicious code cannot knowingly be introduced therein.

FIG. 1 depicts untrusted operating environment 110, trusted operating environment 120, and trusted operating environment 130. Untrusted operating environment 110 may, in some embodiments, correspond to a host operating system. As a host operating system is particularly susceptible to malware, the host operating system may be considered "untrusted." Thus, untrusted operating environment 110 implemented by a host operating system may comprise some amount of malware, which goes hand in hand with its designation as an untrusted operating environment. There may be other risks posed by an untrusted operating environment, e.g., the actual human user interacting with an operating environment may not have the purest of motives or be trustworthy. Consequently, any operating environment without sufficient safeguards to protect the integrity of its own resources against a human user may be deemed an untrusted operating environment. Multiple operating environments executing on the same computer system may, either expressly or implicitly, have some characteristic whereby there is a sequence or hierarchy of trustworthiness to the multiple operating environments; in such an embodiment, the least trustworthy operating environment or those deemed insecure or at risk may be considered an untrusted operating environment, while those operating environments having some tangible or intrinsic characteristic that provides some additional level of security to the integrity of the resources contained therein may be considered trusted operating environments.

Trusted operating environments 120 and 130 may each correspond to an operating environment, such as a virtual machine, in which executes a guest operating system. Trusted operating environments 120 and 130 may be instantiated in a known, trusted state and may possess software mechanisms designed to combat the introduction of any content which may contain malware in an uncontrolled manner, i.e., the operating environment may lack unfettered network access and be de-instantiated after the performance of an action or upon detecting the presence of malware. A non-limiting, illustrative example of a trusted operating environment is a virtual machine disk or virtual machine whose memory cannot be accessed by other virtual machines or execution environments executing upon the same hardware. A virtual machine disk represents the non-transitory data which is necessary to instantiate and execute a virtual machine. The instantiation of a virtual machine disk may cause volatile memory for the virtual machine to be loaded into memory.

Note that a trusted operating environment may, but need not, encompass a complete operating system. In embodiments of the invention, a trusted operating environment may be implemented using a small portion of executable code, such as, for example, a Unified Extensible Framework Interface (UEFI) module or a tiny in-RAM pre-booted Linux virtual machine.

The integrity of trusted operating environments 120 and 130 may be verified using an attestation mechanism. For example, the integrity of trusted operating environments 120 and 130 may, to some extent, be protected using a hypervisor which manages access to the virtual machines implementing trusted operating environments 120 and 130. Other examples of attestation mechanisms include checking file signatures to ensure the state of a file as it current exists matches a state of the file acknowledged as being written by the author of the file. Certain embodiments may use a single attestation mechanism to verify the integrity of trusted operating environments 120 and 130, while other embodiments may use separate attestation mechanisms.

FIG. 1 depicts attester 122 executing within trusted operating environment 120. Attester 122 represents one or more software processes acting as a functional unit to perform the functions attributed to attester 122 in the discussion of FIG. 2 below. Briefly, attester 122 is responsible for instantiating trusted operating environment 130 based, at least in part, on data and/or metadata of untrusted operating environment 110. Furthermore, attester 122 may be responsible for securely attesting the integrity of files and data of trusted operating environment 130.

In some embodiments, some or all of the functions attributed to attester 122 may be performed by other software entities, such as a hypervisor (not depicted in FIG. 1). Thus, while the remainder of this disclosure shall chiefly discuss certain responsibilities as being performed by attester 122, those in the art shall appreciate that in other embodiments various responsibilities of attester 122 may instead be performed instead by a hypervisor or other software entity executing in a trusted operating environment or on a trusted remote network entity.

Embodiments of the invention may use the term "trusted operating environment manager" to refer to a software entity, executing on hardware, which performs the responsibilities of attester 122. Thus, the term trusted operating environment manager may refer to attester 122 or to the combination of trusted operating environment 120 and attester 122.

Other components of FIG. 1 not discussed above shall be discussed below in relation to FIG. 2.

Securely Constructing a Trusted Operating Environment

Advantageously, embodiments enable a trusted operating environment to be instantiated based on data and metadata of an untrusted operating environment. To do so, the data and metadata comprising the trusted operating environment must be attested to be trustworthy, as such data and metadata originated from an untrusted source.

Figure 2:
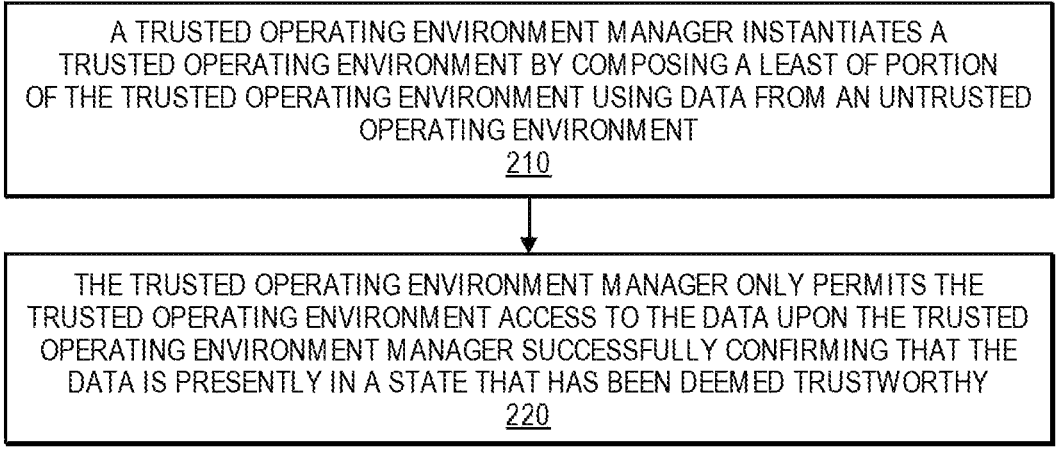
FIG. 2 is a flowchart of securely constructing a trusted operating environment according to an embodiment of the invention.

FIG. 2 is a flowchart depicting the steps of securely constructing a trusted operating environment according to an embodiment of the invention. For clarity, in the explanation of the steps of FIG. 2, trusted operating environment 120 may be referred to as first trusted operating environment 120 and trusted operating environment 130 may be referred to as second trusted operating environment 130.

In step 210 of FIG. 2, attester 122 of first trusted operating environment 120 instantiates second trusted operating environment 130. To instantiate second trusted operating environment, attester 122 may use techniques discussed in U.S. Pat. No. 9,767,274, entitled 'Approaches for Efficient Physical to Virtual Disk Conversion,' issued Sep. 19, 2017, the disclosure of which is hereby incorporated by reference for all purposes as if fully set forth herein.

Attester 122 may instantiate second trusted operating environment 130 so that at least a portion of the files comprised within second trusted operating environment 130 correspond to files found within untrusted operating environment 110. Embodiments may do so in a variety of different manners. For example, attester 122 may make a copy of certain files present in untrusted operating environment 110 and store those copied files in trusted operating environment 130. To illustrate with reference to FIG. 1, in instantiating second trusted operating environment 130, attester 122 may make a copy of file 112, stored by untrusted operating environment 110, and store that complete copy of file 112 as file 132 in second trusted operating environment 130.

Alternately, rather than storing a copy of a particular file in trusted operating environment, attester 122 may store a reference to that file in trusted operating environment 130. To illustrate, again with reference to FIG. 1, in instantiating second trusted operating environment 130, attester 122 may create file 132 in second trusted operating environment 130 to include or correspond to a reference that references or points to file 112 stored by untrusted operating environment 110. Using this approach, when an access request is issued against file 132 in trusted operating environment 130, the access request may be redirected so that the access request is performed against file 112.

Trusted operating environment 130 may also be constructed using a list of files that are stored in untrusted operating environment 110 or retrieved over the network from an external location, such as but not limited to external file repository 140. Each file in the set of files that are retrieved in this manner may be signed by one or more trusted file manufacturers to aid in the verification that the files are produced by a trusted file manufacturer.

Embodiments may take a variety of different approaches with respect to when a decision is made as to which files to include in second trusted operating environment 130. According to one embodiment, this decision may be made prior to receiving a request which would necessitate the instantiation of second trusted operating environment 130. In such an embodiment, attester 122 may identify at least of portion of the files to include in second trusted operating environment 130 by analyzing files in untrusted host operating system 110 prior to any need to instantiate second trusted operating environment 130. Such an analysis may involve determining which files are pertinent to the activity likely to be performed in second trusted operating environment 130. For example, attester 122 may determine that a copy of file 112 or a reference to file 112 should be included in second trusted operating environment 130 because file 112 is a system file that has been identified as being essential to the proper operation of the operating system executing in untrusted operating environment 110. On the other hand, attester 122 may determine that a copy of file 114 or a reference to file 114 should not be included in second trusted operating environment 130 because file 114 is non-essential and extraneous to the proper operation of the operating system executing in untrusted operating environment 110.

Other embodiments, rather than identifying which files to include in second trusted operating environment 130 prior to any need to instantiate second trusted operating environment 130, may identify which files to include in second trusted operating environment 130 only upon receiving an access request for a resource which should be granted or performed within or by second trusted operating environment 130.

Embodiments of the invention may also instantiate second trusted operating environment 130 such that it includes certain files located external to untrusted operating environment. In such an embodiment, attester 122 may identify, based on a policy that considers the reason for instantiating second trusted operating environment 130, one or more other files which should be included within second trusted operating environment 130. Such files may reside within first trusted operating environment 120 or may reside external to device 100, such as over a network stored on external file repository 140.

Many operating system providers, such as Microsoft Corporation, sign at least a portion of the files in their operating system using a digital signature or other such metadata to evidence that those files, in their present state, were created by their company of origin. For example, assume that untrusted operating environment 110 is executing a version of the Microsoft Windows operation system. If a file of the Microsoft Windows operation system has a digital signature, then that digital signature may be used to mathematically prove that the present state of that file was created by Microsoft Corporation.

When second trusted operating environment 130 is instantiated by attester 122, many of the files within second trusted operating environment 130 will be associated with a digital signature by virtue of the files in second trusted operating environment 130 being copies or references to files within untrusted operating environment 110.

Not all files of the Microsoft Windows operating system may be signed in such a fashion. System files, DLL files, executable files, and other such files which are directly pertinent to the successful operation of the core functions of the operating system will likely be accompanied by a digital signature. However, other files not pertinent to the successful operation of the core functions of the operating system, such as certain data files and miscellaneous files (such as games or wallpaper), may not be accompanied by a digital signature. If a file is not associated with a digital signature, embodiments of the invention may retrieve a digital signature for the file from external signature repository 142, which as broadly used herein represents any form of public certification authority. Embodiments may do so by obtaining information that uniquely identifies the file (such as by using a hash function to obtain a hash value for the file), and using that identifying information to obtain a file signature for that file from external signature repository 142.

In an embodiment, when instantiating second trusted operating environment 130 (or at a later point in time, such as when handling a file access request issued by second trusted operating environment 130), attester 122 may authenticate the file signatures associated with a file of second trusted operating environment 130 to ensure that the file has not been modified or changed since leaving the custody of its manufacturer or provider. If attester 122 determines that a file of second trusted operating environment 130 is not associated with a file signature, then in an embodiment attester may obtain a file signature for that file by analyzing the contents of the file (for example, by obtaining a hash of the file) and thereafter using that information to obtain a digital signature for that file from external signature repository 142 or a replacement file from external file repository 140. The decision of whether to obtain a digital signature for that file from external signature repository 142 or a replacement file from external file repository 140 may be made by attester 122 in consultation with a policy that considers one or more factors, such as the nature of the file and the rationale for instantiating second trusted operating environment 130.

In step 220 of FIG. 2, each time an access request for a file stored by second trusted operating environment 130 is issued to second trusted operating environment 130, attester 122 only permits the access request to be performed only after attester 122 successfully determines that the file which is the subject of the access request is associated with an authenticated digital signature. If the digital signature is authenticated, then this evidences that the present state of the file has not been modified since leaving the custody of the file's manufacturer.

When second trusted operating environment 130 is instantiated, second trusted operating environment 130 may be provided with a virtual interface to persistent storage, such as a hard-disk drive or a solid-state device. Second trusted operating system 130 may also be provided with a virtual machine to access resources stored in volatile memory. Such a virtual interface may be a mechanism in which all requests for accessing resources stored in memory or on a persistent storage medium will be directed through attester 122. In this fashion, attester 122 resides in the path of any attempt by second trusted operating environment 130 to access a resource stored in memory or in persistent storage.

When attester 122 determines that a file stored by said second trusted operating environment 130 references a file stored by untrusted operating environment 110, attester 122 authenticates that the file signature associated with the file stored by untrusted operating environment 110 to ensure that the file signature evidences that the file stored by untrusted operating environment 110 has not been modified since leaving the custody of the file's manufacturer. If the file stored by second trusted operating environment 130 references the file stored by untrusted operating environment 110 having an authenticated file signature, then by extension the file stored by second trusted operating environment 130 has been demonstrated to have not been modified since leaving the custody of the file's manufacturer.

Recall that the authenticity of the file signatures associated with files of second trusted operating environment 130 may be assessed at different points in time. In an embodiment, prior to second trusted operating environment 130 issuing an access request to file 132 of second trusted operating environment, attester 122 may determine whether file 132 stored by said second trusted operating environment references another file, such as for example file 112, stored by untrusted operating system 110. If attester 122 does so determine, then attester 122 may verify that a file signature associated with file 112 evidences that file 112 has not been modified since leaving the custody of the manufacturer of file 112. If attester 122 is able to successfully affirm that the file signature associated with file 112 evidences that file 112 has not been modified since leaving the custody of the manufacturer of file 112, then attester 122 may store, within trusted operating environment 120, a validation record that verifies that the file signature of 112, and by extension file 132, was successfully authenticated. Thereafter, upon attester 122 intercepting or receiving notification that an access request was issued against file 132 in second trusted operating environment 130, attester 122 may consult the validation record associated with file 132 to determine whether to permit the performance of the access request to file 132.

In an embodiment, validation records of file signatures may be stored in first trusted operating environment 120 in a Merkle hash tree. A Merkle hash tree is a tree in which every leaf node is labelled with a data block and every non-leaf node is labelled with the cryptographic hash of the labels of its child nodes. Attester 122 may store in a Merkle hash tree, for any number of files stored by second trusted operating environment 130, a validation signature.

In another embodiment, when an access request for a file stored by second trusted operating system 130 is received, attester 122 authenticates the file signatures associated with the file at the time the access request is issued. Attester 122 only permits the access request to be performed upon successfully being able to authenticate the file signature associated with the file for which the access request was issued.

Hopefully, when attester 122 verifies a file signature of a file, the file signature will be authenticated. However, it may come to pass that a file signature of a file cannot be authenticated. Embodiments of the invention may take a variety of approaches in response. In one approach, upon determining that a file signature associated with a file evidences that the file has been modified since leaving the custody of the file's manufacturer, attester 122 may de-instantiate second trusted operating environment 130 or subsequently cease to affirm to other programmatic or computational entities that second trusted operating environment 130 is secure while second trusted operating environment 130 is instantiated.

In another approach for handling file signatures that cannot be authenticated, upon attester 122 determining that a file signature associated with a file evidences that the file has been modified since leaving the custody of the file's manufacturer, attester 122 may (a) obtain a copy of, or a reference to, a replacement file stored at a location remote to device 100 (such as external file repository 140) or from within first trusted operating environment 120. The copy of, or a reference to, the replacement file may be supplied to second trusted operating environment 130 so that second trusted operating environment may safely perform a file operation using the replacement file which has previously been deemed trustworthy.

After the creation of second trusted operating environment 130, a template virtual machine that be created that that references or comprises at least a portion of second trusted operating environment 130 using the approach discussed in the aforementioned '980 patent.

Hardware Mechanisms

FIG. 3 is a block diagram that illustrates a computer system 300 upon which an embodiment of the invention may be implemented. In an embodiment, computer system 300 includes processor 304, main memory 306, ROM 308, storage device 310, and communication interface 318. Computer system 300 includes at least one processor 304 for processing information. Computer system 300 also includes a main memory 306, such as a random-access memory (RAM) or other dynamic storage device, for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device for storing static information and instructions for processor 304. A storage device 310, such as a magnetic disk or optical disk, is provided for storing information and instructions.

Computer system 300 may be coupled to a display 312, such as a cathode ray tube (CRT), a LCD monitor, and a television set, for displaying information to a user. An input device 314, including alphanumeric and other keys, is coupled to computer system 300 for communicating information and command selections to processor 304. Other non-limiting, illustrative examples of input device 314 include a mouse, a trackball, or cursor direction keys for communicating direction information and command selections to processor 304 and for controlling cursor movement on display 312. While only one input device 314 is depicted in FIG. 3, embodiments of the invention may include any number of input devices 314 coupled to computer system 300.

Embodiments of the invention are related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory machine-readable storage medium" as used herein refers to any tangible medium that participates in persistently storing instructions which may be provided to processor 304 for execution. Storage device 310 may correspond to a non-transitory machine-readable storage medium. Non-limiting, illustrative examples of non-transitory machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of non-transitory computer-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a network link 320 to computer system 300.

Communication interface 318 provides a two-way data communication coupling to a network link 320 that is connected to a local network. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through a local network to a host computer or to data equipment operated by an Internet Service Provider (ISP).

Computer system 300 can send messages and receive data, including program code, through the network(s), network link 320 and communication interface 318. For example, a server might transmit a requested code for an application program through the Internet, a local ISP, a local network, subsequently to communication interface 318. The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium storing one or more sequences of instructions for securely constructing a trusted virtual machine disk, which when executed, cause:

a device comprising an untrusted operating environment, a first trusted operating environment, and a second trusted operating environment, wherein an operating environment refers to a self-contained bounded environment for executing software;

a trusted operating environment manager within the first trusted operating environment, executing on the device, instantiating said the second trusted operating environment comprising the trusted virtual machine disk on said device by composing at least a portion of said trusted virtual machine disk using data from a host operating system of an untrusted operating environment also executing on said device by storing, in the trusted virtual machine disk, a reference to the data from the host operating system, wherein the trusted operating environment manager creates a file in the second trusted operating environment to include the reference that points to another file stored by the untrusted operating environment; and each time an access request from a user associated with the device for a file stored by the second trusted operating environment is issued to the second trusted operating environment, the trusted operating environment manager only permitting the access request to be performed and said trusted virtual machine disk to access said data upon the trusted operating environment manager successfully confirming that the file which is the subject of the access request is associated with an authenticated digital signature and when the digital signature is authenticated, then evidences that said data is presently in a state corresponding to when said data left the custody of its manufacturer.

2. The non-transitory computer-readable storage medium of claim 1, wherein a determination is made as to whether said data is presently in said state corresponding to when said data left the custody of its manufacturer in response to said trusted virtual machine disk making a request for said data.

3. The non-transitory computer-readable storage medium of claim 1, wherein a determination is made as to whether said data is presently in said corresponding to when said data left the custody of its manufacturer prior to said trusted virtual machine disk making a request for said data.

4. The non-transitory computer-readable storage medium of claim 1, wherein said data contains sequences of executable instructions for determining the trustworthiness of a set of other files, other than said data, comprised within said trusted virtual machine disk.

5. The non-transitory computer-readable storage medium of claim 1, wherein execution of the one or more sequences of instructions further cause:

verifying the integrity of said trusted virtual machine disk and said trusted operating environment using the same attestation mechanism.

6. The non-transitory computer-readable storage medium of claim 1, wherein instantiating the trusted operating environment comprises:

dynamically identifying a least of portion of files, which reside in a location external to said device, to include in said trusted virtual machine disk.

7. The non-transitory computer-readable storage medium of claim 6, wherein said portion of files correspond to a set of files which are not associated with a file signature that evidences whether the file has been modified since leaving the custody of said file's manufacturer.

8. The non-transitory computer-readable storage medium of claim 1, further comprising:

storing in a Merkle hash tree, for each of a plurality of files stored by said untrusted operating environment, a validation signature that evidences whether a particular file in said plurality of files has not been modified since leaving the custody of said particular file's manufacturer.

9. The non-transitory computer-readable storage medium of claim 1, wherein the trusted operating environment manager only permits an access request for a file to be performed upon successfully determining that said file has not been modified since leaving the custody of said file's manufacturer, and wherein execution of the one or more sequences of instructions further cause:

upon determining that a file signature associated with said file evidences that said file has been modified since leaving the custody of said file's manufacturer, performing one or more of:
(a) de-instantiating said untrusted operating environment,
(b) subsequently ceasing to attest said untrusted operating environment as being secure to other computational entities while said untrusted operating environment is instantiated, and
(c) returning an error code into said untrusted operating environment to indicate that the disk read failed.

10. The non-transitory computer-readable storage medium of claim 1, wherein the trusted operating environment manager only permits an access request for a file to be performed upon successfully determining that said file has not been modified since leaving the custody of said file's manufacturer, and wherein execution of the one or more sequences of instructions further cause:

upon determining that a file signature associated with said file evidences that said file has been modified since leaving the custody of said file's manufacturer, the trusted operating environment manager (a) obtaining, from a location remote to said device or from said trusted virtual machine disk, a different version of said file and (b) supplying said different version of said file to said untrusted operating environment for use in performing said access request.

11. The non-transitory computer-readable storage medium of claim 1, wherein execution of the one or more sequences of instructions further cause:

creating a template virtual machine that references or comprises at least a portion of said trusted virtual machine disk.

12. The non-transitory computer-readable storage medium of claim 1, wherein said data is confirmed to be presently in a state corresponding to when said data left the custody of its manufacturer by consulting a list of known good file hashes.

13. The non-transitory computer-readable storage medium of claim 1, wherein said data is confirmed to be to be presently in a state corresponding to when said data left the custody of its manufacturer by validating a signature applied to the data by its manufacturer, and wherein the signature is validated using one or more public certification authorities.

14. The non-transitory computer-readable storage medium of claim 1, wherein said data is confirmed to be presently in a state corresponding to when said data left the custody of its manufacturer by validating a signature applied to the data by its manufacturer, and wherein the signature is validated against a single certificate known to belong to said manufacturer.

15. The non-transitory computer-readable storage medium of claim 1, wherein for each subsequent request, after an initial request, for said data made by the untrusted operating system, the trusted operating environment manager refers to information about the trustworthiness of said data that was calculated during said initial request.

16. The non-transitory computer-readable storage medium of claim 1, wherein the trusted virtual machine disk is composed from a set of files known to have been produced by one or more trusted file manufacturers.

17. The non-transitory computer-readable storage medium of claim 16, wherein the set of files is recorded in one or more lists of files; and said one or more lists of files are each signed by one of said one or more trusted file manufacturers.

18. The non-transitory computer-readable storage medium of claim 17, wherein the one or more lists of files are stored in the untrusted operating environment.

19. The non-transitory computer-readable storage medium of claim 17, wherein the lists of files are retrieved over a network.

20. An apparatus for securely constructing a trusted virtual machine disk, comprising:
one or more processors; and
one or more non-transitory computer-readable storage mediums storing one or more sequences of instructions, which when executed, cause:
a trusted operating environment manager operating within a first trusted operating environment, executing on a device comprising an untrusted operating environment, the first trusted operating environment, and a second trusted operating environment, wherein an operating environment refers to a self-contained bounded environment for executing software, instantiating said the second trusted operating environment comprising the trusted virtual machine disk on said device by composing at least of portion of said trusted virtual machine disk using data from a host operating system of an untrusted operating environment also executing on said device by storing, in the trusted virtual machine disk, a copy of the data from the host operating system, wherein the trusted operating environment manager creates a file in the second trusted operating environment to include the reference that points to another file stored by the untrusted operating environment; and
each time an access request from a user associated with the device for a file stored by the second trusted operating environment is issued to the second trusted operating environment, the trusted operating environment manager only permitting the access request to be performed and said trusted virtual machine disk to access said data upon the trusted operating environment manager successfully confirming that the file which is the subject of the access request is associated with an authenticated digital signature and when the digital signature is authenticated, then evidences that said data is presently in a state corresponding to when said data left the custody of its manufacturer.

21. A method for securely constructing a trusted virtual machine disk, comprising:
a device comprising an untrusted operating environment, a first trusted operating environment, and a second trusted operating environment, wherein an operating environment refers to a self-contained bounded environment for executing software;
a trusted operating environment manager within the first trusted operating environment, executing on the device, instantiating said the second trusted operating environment comprising the trusted virtual machine disk on said device by composing at least of portion of said trusted virtual machine disk using data from a host operating system of an untrusted operating environment also executing on said device by storing, in the trusted virtual machine disk, a reference to the data from the host operating system, wherein the trusted operating environment manager creates a file in the second trusted operating environment to include the reference that points to another file stored by the untrusted operating environment; and
each time an access request from a user associated with the device for a file stored by the second trusted operating environment is issued to the second trusted operating environment, the trusted operating environment manager only permitting the access request to be performed and said trusted virtual machine disk to access said data upon the trusted operating environment manager successfully confirming that the file which is the subject of the access request is associated with an authenticated digital signature and when the digital signature is authenticated, then evidences that said data is presently in a state corresponding to when said data left the custody of its manufacturer.

\* \* \* \* \*